March 8, 1966     P. C. TREXLER     3,238,922
AXEMIC FOR LIVE ANIMALS

Filed Nov. 13, 1964     3 Sheets-Sheet 1

INVENTOR.
Philip C. Trexler
BY
Morse, Altman & Oates
ATTORNEY

March 8, 1966 P. C. TREXLER 3,238,922
AXEMIC FOR LIVE ANIMALS

Filed Nov. 13, 1964 3 Sheets-Sheet 2

INVENTOR.
Philip C. Trexler
BY Morse, Altman + Oates
ATTORNEY

United States Patent Office 3,238,922
Patented Mar. 8, 1966

3,238,922
AXENIC CONTAINER FOR LIVE ANIMALS
Philip C. Trexler, Stoneham, Mass., assignor to The Charles River Breeding Laboratories, Inc., North Wilmington, Mass., a corporation of Massachusetts
Filed Nov. 13, 1964, Ser. No. 410,901
16 Claims. (Cl. 119—15)

This invention relates to shipping containers for live animals and particularly to shipping containers providing a sterile environment for gnotobiotic animals.

Gnotobiotic or experimental animals include animals of only known biological species such as axenic animals bred and reared so as to be free of contamination by other biological species, particularly microorganisms. Such animals, particularly small animals, are bred and reared under carefully controlled sterile conditions in isolators and constitute a valuable product useful in medical and biological research.

An object of the present invention is to provide a novel and improved container for shipping live animals, capable of maintaining the animals in a healthy condition free of contamination by microorganisms.

Another object of the invention is to provide a shipping container of the type described which is inexpensive, easily sterilized, light and compact, facilitates transfer of the animals to and from the container in an axenic condition and can be readily sealed against the admission of contaminants.

A further object of the invention is to provide a shipping container as described including improved means for assuring adequate ventilation of the container.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 2:
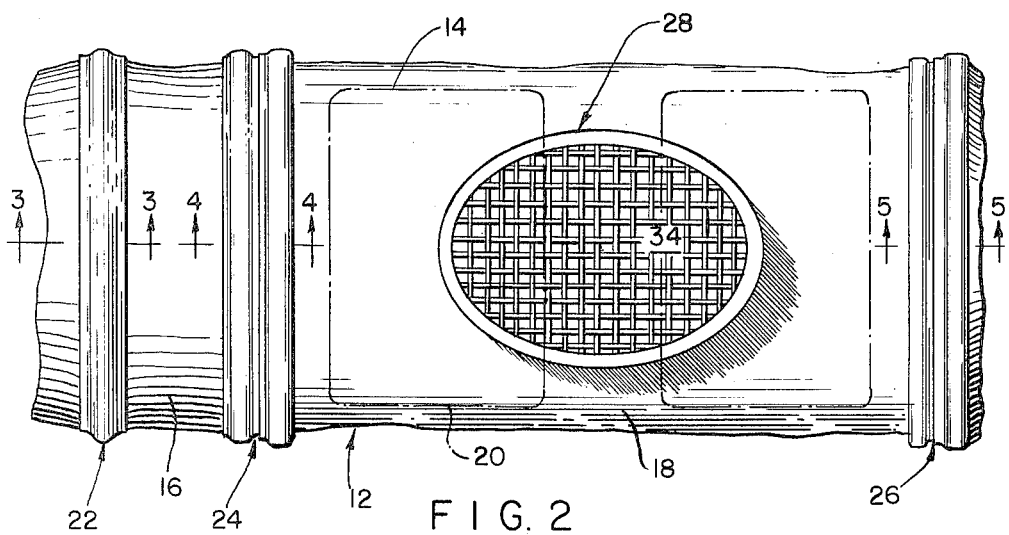
FIG. 2 is a plan view of a major component of the container illustrating the invention.
Figure 3:
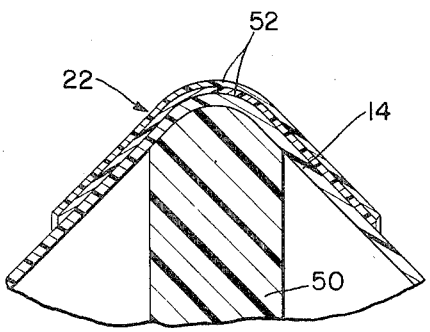
Figure 4:
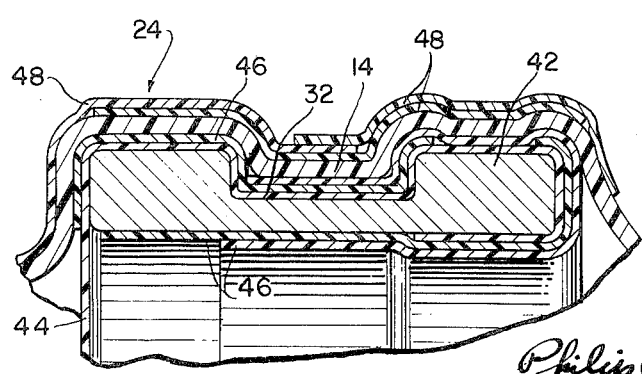
Figure 5:
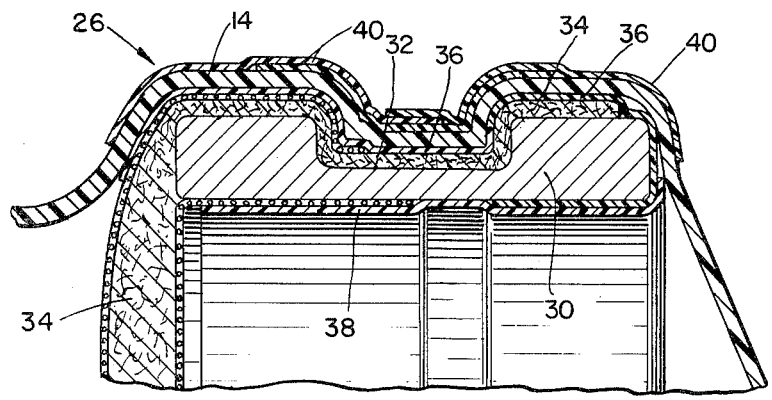
Figure 6:
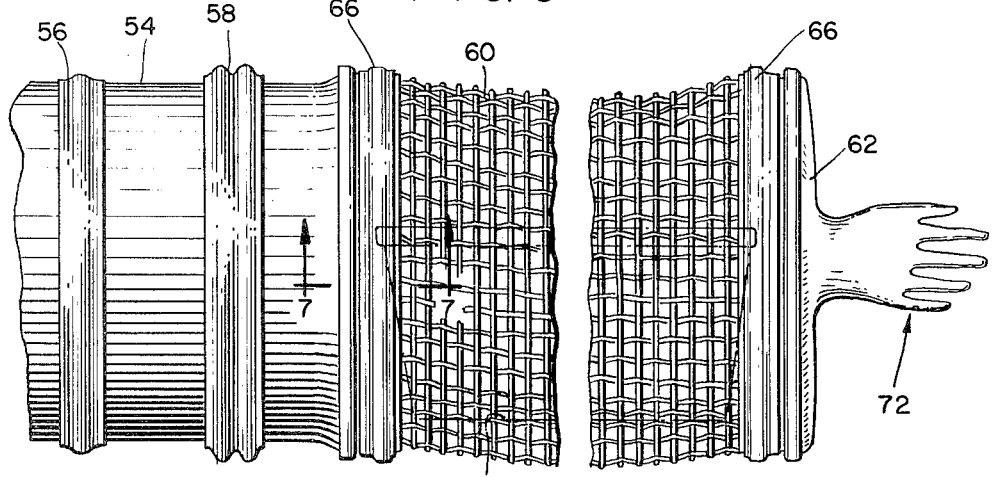
Figure 7:
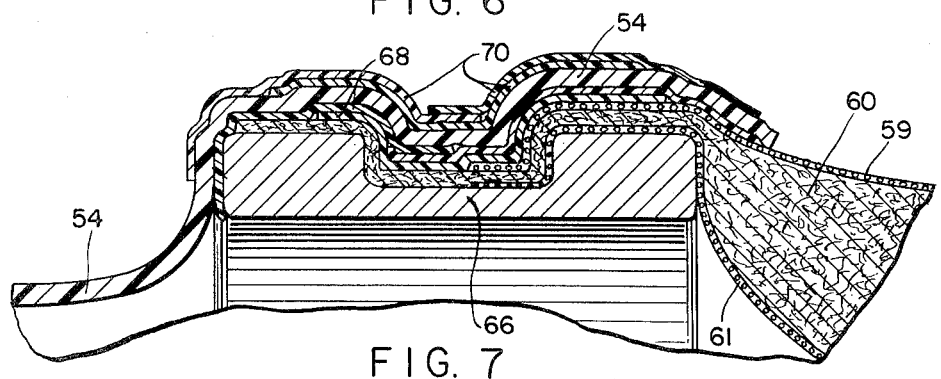

FIGS. 3, 4 and 5 are fragmentary perspective views taken, respectively, along the lines 3—3, 4—4 and 5—5 of FIG. 2;

FIG. 6 is an elevation view of another embodiment of the shipping container; and FIG. 7 is a fragmentary sectional view taken substantially along the line 7—7 of FIG. 6.

Axenic, or germ-free, animals are bred and reared in closed systems or environments provided by apparatus usually referred to as "isolators," and comprising a sealed chamber with provision for the admission of uncontaminated air and the introduction and removal of the animals themselves as well as the various materials such as cages and food required for the care and sustenance of the animals, while maintaining the system free of contamination. Air is circulated by way of filters which remove all microorganisms including microflora and fauna, the animals are handled with the aid of gloves, sleeves or similar body-containing devices sealed within openings in the isolator and materials and animals are introduced into and withdrawn from the isolators by way of vestibular double-door chambers called "locks" which may be sealed off from both the isolator and the environment and sterilized. In order to remove something, e.g., an animal, from the isolator without contaminating the sealed environment thereof, the practice is to seal the inner closure between the isolator and lock and the outer closure between the lock and the outside environment, then sterilize the interior of the lock by introducing a sterilizing medium such as steam or a chemical agent such as ethylene oxide, into the lock, and then opening the inner door, transferring the object to the lock and resealing the inner door prior to opening the outer door.

The shipping container of the invention is, in substance, an inexpensive, lightweight isolator for small animals such as mice, rats, guinea pigs and the like, for maintaining the animals in a healthy condition free from contamination for relatively brief periods such as required for shipment from the breeder to the consumer. Such a container should be inexpensive and lightweight for obvious reasons and, in addition thereto, must provide for adequate ventilation and protect the animals from contamination and physical injury.

Figure 1:
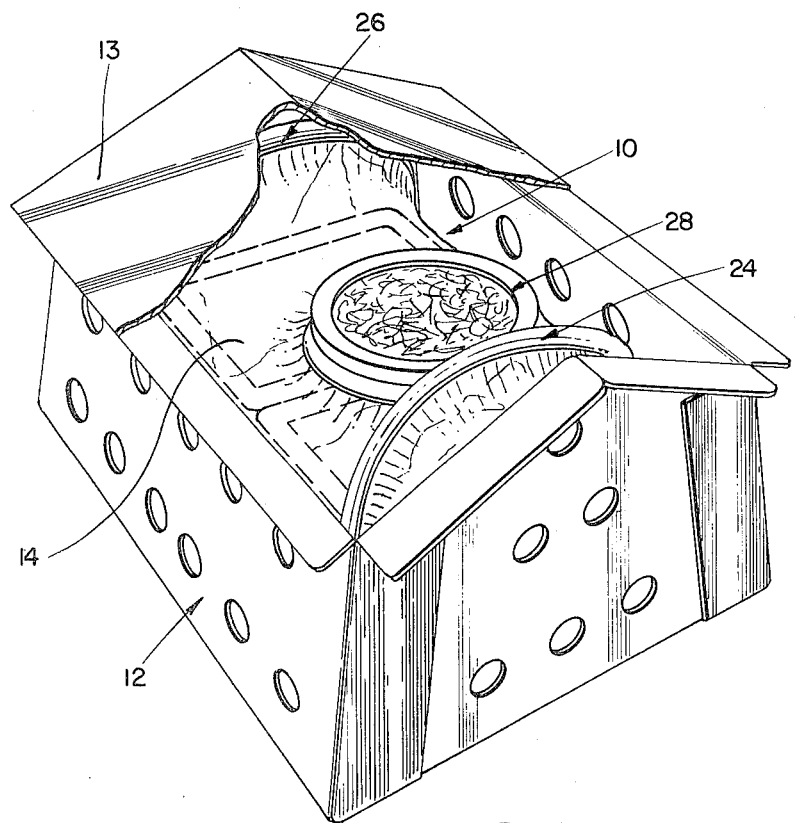
FIGURE 1 is a perspective view of a shipping container constructed in accordance with the invention.

Reference is now made to FIGS. 1 and 2 of the drawings wherein there is shown a shipping container of the type described embodying the invention. The container comprises an isolator assembly 10 and a box or carton 12 for enclosing and protecting the isolator assembly. Box 12 is formed of a substantially rigid, inexpensive material such as corrugated cardboard, completely encloses the isolator and is provided with a generous number of openings in its walls for the free circulation of air. Box 12 is constructed in the form of a house with a removable peaked cover 13 which helps to insure that the container is not inverted and that other objects will not be placed on top of the container in such a way as to crush it or restrict air circulation. The side and/or end walls of box 12 are also inclined inwardly to further insure air circulation around and through the box and that the box and the isolator contained therein remain in an upright position as this is important to insure proper ventilation and prevent injury to the animals. In most other respects, the construction of box 12 is typical of conventional cardboard shipping containers.

Isolator assembly 10 contained within box 12, is designed to be readily sterilized, coupled with the lock of a rearing isolator to permit transfer of the animals, and then sealed against the admission of microorganisms; and includes means providing for circulation of filtered air through the sterile environment within the isolator. In the form shown in FIG. 2, isolator 10 comprises an elongated sleeve 14 formed of a flexible sheet or film material which is impervious to microorganisms. The film is preferably a transparent, organic plastic material allowing observation of the animals and permitting manipulation of the contents of the isolator, particularly doors and cages, from the exterior of the isolator. Organic plastics preferred for the sleeve include polymers which are tough and resistant to tearing and puncture, are relatively inert, can be sterilized by heat—dry or steam—or by chemical agents; and will stretch at least slightly, preferably elastically. Examples of such materials include the vinyl polymers, polyethylene and polypropylene. An example of a preferred material for the sleeve is a seamless tube of vinyl film having a thickness of the order of 10 to 12 mils.

Engaged within sleeve 14 are three closures dividing the sleeve into an outer chamber or lock 16 and an inner chamber 18 for containing live animals, either freely or in cages shown by broken lines and designated 20. The closures comprise an outer door 22 at one end of the sleeve, an inner door 24 cooperating with the outer door to define the outer chamber and an end closure 26 in the other end of the sleeve cooperating with the inner door to define inner chamber 18. The isolator assembly shown in FIG. 2 also includes a filter 28 secured in an opening in the upper portion of sleeve 14 between door 24 and closure 26 above cages 20 for passing air between chamber 18 and the exterior of the isolator assembly. Outer door 22 and inner door 24 are impervious to air so that chamber 16 can be sealed and sterilizing agents can be introduced into chamber 16 yet excluded from inner chamber 18 containing the animals.

Provision is made for insuring circulation of air through chamber 18 and this includes both filter 28 in the upper part of the chamber for exhausting air from the chamber and another filter for admitting air to chamber 18 at a location below the level of filter 28. In the form shown in FIGS. 2 and 5, this second filter comprises a component of end closure 26. The two filters are arranged so that a convection current is established as the air within chamber 18 is heated by the animals and rises to pass through filter 28 while cooler air is drawn in through end closure 26 at a lower level. Increased circulation of air can be achieved, if desired, by forcing air into chamber 18 through the end closure by such means as a fan, with the air being exhausted through closure 28.

End closure 26 and filter 28 are similarly constructed and each comprises a substantially rigid ring 30 formed, for example, of metal. The ring of closure 26 is preferably circular so as to fit within sleeve 14 while the ring comprising filter 28 is preferably elliptical since it is secured within an opening in the sleeve and this form facilitates attachment of the sleeve to the ring in this location. Each ring 30 includes an outer peripheral surface having a medial peripheral recess or groove 32 to facilitate retention of the filter material and sleeve in intimate engagement with the ring and with each other. Each of the filters comprises a diaphragm or panel 34 attached at its edges to the ring and formed of a filter material for passing air but not microorganisms such as bacteria and the like. Each filter panel 34 comprises a porous or fibrous filter material such as fine glass wool, e.g., three layers of Owens-Corning FM 003 fiberglass sandwiched between panels of a fine mesh such as conventional plastic or fiberglass window screen, which protect and confine the fibrous filter material. The filter panel, or at least the filter material and outer mesh, is adhered at its edges to ring 30 by windings of tape 36 wound tightly about the edges of the filter and outer periphery of ring 30 so that the edge portions of the panel are compressed against and made to conform to the surface contour of the ring. Tape 36 is preferably a plastic tape having some elasticity and coated with a pressure-sensitive adhesive, e.g., conventional vinyl or polyvinyl chloride tape. Several windings of the tape are employed, with the first or inner winding overlapping and adhered to both the filter panel and the ring with successive outer windings overlapping one another. The edge of the inner protective mesh is preferably adhered to the inside of the ring by a separate winding 38 so that there is intimate contact between the fibrous filter material and the outer surface of ring 30.

The sleeve or edge portions thereof adjacent an opening therein, are secured to the outer periphery of the foregoing closure or filter assembly by additional windings 40 of the same pressure-sensitive adhesive tape applied tightly and in overlapping relation so that the material of the sleeve is retained in intimate contact with the windings of tape 36 retaining the filter panel on the ring. The sleeve also is caused to conform substantially to the contour of the peripheral surface of the ring to prevent separation of or relative movement between the ring and sleeve. This construction of the filters and their attachment to the sleeve is inexpensive and easily accomplished thereby contributing to making the entire isolator assembly expendable if desired. All of the materials employed, with the possible exception of a metal ring, are fiberglass and/or plastics which are relatively inert and can be readily and easily sterilized either by heat or chemical sterilizing agents.

Closure 24 functions as a door which can be opened and/or sealed while remaining in a sterile condition both inside and out, and in the form shown, comprises a ring 42 substantially the same as ring 30, to which is secured an air impervoius diaphragm 44 by tape windings 46. Diaphragm 44 preferably comprises a thin transparent plastic film, for example, polyethylene terephthalate resin, stretched tightly across ring 42 and bound to the ring by the tape so as to conform to the configuration of the outer peripheral surface of the ring. Thin, transparent film is the preferred material because it allows for observation of the animals through the inner door and can be ruptured to torn to gain access to chamber 18. Ring 42 may be circular and in the preferred form shown is slightly oblate or elliptical to facilitate manipulation of closure 24 within the sleeve; and is retained in closed, sealed condition by outer windings 48 of tightly wrapped, slightly elastic, pressure-sensitive adhesive tape which causes the sleeve to conform to and make intimate contact with the outer surface of the inner tape windings 46.

Outer door 22 functions to protect inner door 24 and cooperates therewith to form chamber 16 which may be employed as a lock that may be sterilized separately from chamber 18. Door 22 comprises a generally rectangular panel 50 with rounded corners formed of a rigid material such as sheet metal or plastic. The edges of panel 50 are rounded or beveled and have a girth at least equal to and preferably slightly greater than the girth of sleeve 14, and the panel is retained within the sleeve by multiple tape wrappings 52 engaged around the exterior of the sleeve. The girth of the panel is preferably greater than that of the sleeve so that the sleeve is stretched around the panel to make intimate contact therewith; and the panel is rectangular to facilitate passing the panel through circular openings of about the same diameter as the sleeve and comprising means such as the lock of a breeding or rearing isolator.

Before the shipping container can be employed to hold animals, at least chamber 18 must be sterilized. This is accomplished by closing the isolator assembly and subjecting at least the inside thereof to a sterilizing treatment, for example, by applying heat to the assembly, e.g., steam, or introducing a sterilizing agent into the assembly. The assembly is closed and sterilized preferably by locating the inner door within the sleeve in an open position and then sealing the outer door and introducing the sterilizing agent so that the entire inner surface of the sleeve as well as the complete inner door are sterilized. After removal and/or neutralization of the sterilizing agent, the isolator assembly is ready for use or may be stored or shipped and remains in a sterile condition ready for use.

When axenic animals are to be loaded into the isolator from another isolator, inner door 24 is mainpulated into place and secured as described by windings of tape or, temporarily, by windings of an elastic material. Door 22 is then opened and either removed or allowed to remain within the sleeve which is then coupled with or sealed to the lock of another isolator and a sterilizing agent is introduced into the lock and chamber 16 of the sleeve to sterilize the lock, sleeve, door 22, if desired, and outside of door 24.

Following removal and/or neutralization of the sterilizing agent, the windings retaining door 24 in place are removed and the door is opened to allow transfer of animals from one isolator through the lock and chamber 16 to chamber 18. Door 24 is then manipulated into closed position and sealed by wrapping tape tightly about the outside of the sleeve and ring 42. Door 22 may, if desired, also be closed and sealed in the manner described for the purpose of protecting door 24 against damage and/or contamination. Removal of the animals from chamber 18 to another isolator is substantially the reverse of the loading procedure and involves coupling the sleeve with the lock of the isolator and sterilizing the lock and interior of the sleeve up to and including the exterior of door 24. It is unnecessary to open door 24 but instead, the door can be ruptured in which case the oblate configuration of ring 42 facilitates passage of rectangular cages through the ring.

When greater air circulation and ventilation is desired as during warm weather, an embodiment similar to the isolator assembly shown in FIGS. 6 and 7 may be preferred. In the form shown, this isolator assembly comprises a plastic film sleeve 54, an outer door 56 and an inner door 58 all substantially as shown and described in FIGS. 1 through 4, and constructed to function in substantially the same manner. The assembly includes a filter sleeve 60 coupled with sleeve 54 and an end closure 62 cooperating with the filter sleeve and inner door to provide a chamber for containing animals. Filter sleeve 60 comprises a tube or sleeve of the multilayer fibrous filter material sandwiched for support and protection between outer and inner mesh layers 59 and 61 respectively and secured to rings 66, similar to rings 30, in the manner previously described, by windings 68 of pressure-sensitive adhesive tape. Sleeve 54 is secured to and around one end of filter sleeve 60 at a ring 66 by tape windings 70 wrapped tightly about the outside of sleeve 54. A closure panel or diaphragm is secured to the outside of the other ring 66 to form end closure 62. This last-mentioned diaphragm or panel may comprise a filter, a transparent diaphragm or a flexible body enclosing member such as a sleeve and glove 72 to facilitate handling of animals or cages within chamber; and is secured at its edge around ring 66 by tape windings as described. Air circulation in this embodiment is greatly enhanced due to the fact that the sleeve comprising the chamber for the animals is formed entirely of an air admitting filter material.

The two embodiments of the shipping container described herein constitute inexpensive, lightweight and easily manipulated isolators for holding live gnotobiotic animals and maintaining them in a healthy condition in an isolated environment. The containers can be readily sterilized and then stored indefinitely in a sterile condition ready for immediate use, and once used, may be discarded.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. An isolation container for live gnotobiotic animals comprising, in combination:
    a sleeve formed of a flexible sheet material impervious to microorganisms;
    a closure in one end of said sleeve including a filter impervious to microorganisms for admitting air to said interior of said sleeve;
    an inner door engaged in closed relation within said sleeve intermediate the ends of said sleeve and cooperating with said closure to form a chamber for holding said animals, said inner door being air impervious and being movable within said sleeve between open and closed positions;
    means exterior of said sleeve for retaining said inner door and said sleeve in sealed relation;
    a filter impervious to microorganisms engaged within an opening in the upper portion of said sleeve between said inner door and said closure for exhausting air from said chamber; and
    an outer door engaged in the other end of said sleeve in closing relation to said sleeve and cooperating with said inner door to provide a second chamber.

2. A shipping container for live gnotobiotic animals comprising, in combination:
    a sleeve formed of a flexible sheet material impervious to microorganisms;
    a first enclosure in one end of said sleeve, said closure including an outer rim engaged within said sleeve and retaining means for retaining said sleeve in intimate engagement with said rim;
    a second closure including an outer rim engaged within said sleeve at a location spaced from said first closure providing a chamber therebetween for containing said animals and retaining means exterior of said sleeve for releasably retaining said sleeve in intimate engagement with the last-mentioned rim;
    filter means formed of a filter material impervious to microorganisms for passing air into and from said chamber and including a first portion disposed in an upper section of said sleeve between said closures for exhausting air from said chamber and a second portion disposed in at least one of said sleeves and said first closure below the level of said first portion for admitting air to said chamber; and
    a third closure releasably engaged in the opposite end of said sleeve from said first closure and cooperating with said sleeve and said second closure to form a second chamber between said second and third closures.

3. The container of claim 2 in which said flexible sheet material is a transparent polymeric film.

4. The container of claim 2 in which each of said rims is in the form of a ring having an outer peripheral surface with a peripheral groove, and said retaining means cause said sleeve to conform substantially to the contours of said rings thereby forming a seal between said sleeve and said rings.

5. The container of claim 4 in which said retaining means comprise a strip wound tightly about said sleeve and adhered to sleeve.

6. The container of claim 4 in which said first closure comprises said second portion of said filter means and is in the form of a diaphragm of said filter material secured to said ring of said first closure.

7. The container of claim 6 in which the last-mentioned ring and said diaphragm are generally circular and said diaphragm is secured to the outer periphery of said last-mentioned ring within said sleeve by adhesive tape wrapped tightly about said diaphragm and said last-mentioned ring.

8. The container of claim 2 in which the major portion of said sleeve intermediate said first and second closures is formed of said filter material.

9. The container of claim 8 in which said first closure comprises a diaphragm supported on the first-mentioned rim and a glove secured within an opening in said diaphragm.

10. The container of claim 2 in which said filter means comprise a substantially rigid ring having an outer peripheral surface with a medial peripheral groove and a panel of said filter material secured to said outer surface by a strip wound tightly about and adhered to said filter material and said ring; and said sleeve is secured to the outside of said ring by a strip wound tightly about said sleeve and ring so as to cause said sleeve to conform to the contour of said outer surface of said ring.

11. A shipping container as defined in claim 2 including an outer carton formed of a rigid material surrounding said sleeve and formed with openings for admitting air to the interior of said carton.

12. The shipping container of claim 10 in which said carton comprises upstanding side walls inclined inwardly and a cover comprising two panels inclined downwardly from a medial ridge.

13. In an isolation container for maintaining live animals in an axenic environment and including a sleeve enclosure formed of a flexible plastic film, in combination:
    a closure for said sleeve comprising a substantially rigid ring having an outer peripheral surface with a medial peripheral groove and a panel of a material impervious to microorganisms secured at its edges to said ring;

said ring having a girth at least equal to the girth of said sleeve and engaged in closing relation within said sleeve; and retaining means in the form of a strip wound tightly about said sleeve and said ring and adhered at least to said rings causing said sleeve to conform substantially to the contour of said outer surface of said ring.

14. The container of claim 13 in which said strip is formed of a semi-elastic sheet material coated with a contact adhesive.

15. The container of claim 13 comprising at least two of said closures secured in spaced relation within said sleeve to provide a chamber for said animals, and said panel of one of said closures comprises a filter for passing air to and from said chamber.

16. An isolation container for shipping live animals comprising, in combination:

an isolation unit including a flexible sleeve with spaced closures providing a chamber for said animals and filters for admitting air, free of microorganisms, to and from said chamber; and a rigid, protective container enclosing said isolation unit including upstanding walls inclined inwardly and perforated to provide for air circulation and a cover having a medial ridge with lateral panels inclined downwardly from said ridge.

References Cited by the Examiner
UNITED STATES PATENTS

| | | | |
|---|---|---|---|
| 2,244,082 | 6/1941 | Reyniers | 128—1 |
| 3,051,163 | 8/1962 | Trexler | 128—1 |
| 3,058,446 | 10/1962 | Long | 119—30 |
| 3,108,569 | 10/1963 | Kundikoff | 119—19 |
| 3,122,127 | 2/1964 | Shechmeister et al. | 119—18 |

SAMUEL KOREN, *Primary Examiner.*

ALDRICH F. MEDBERY, *Assistant Examiner.*